(12) United States Patent
Park et al.

(10) Patent No.: US 11,539,073 B2
(45) Date of Patent: Dec. 27, 2022

(54) POLYMER ELECTROLYTE FOR SECONDARY BATTERY COMPRISING LITHIUM SALT AND POLYMER AND LITHIUM SECONDARY BATTERY INCLUDING THE SAME

(71) Applicant: LG Chem, Ltd., Seoul (KR)

(72) Inventors: Sol Ji Park, Daejeon (KR); Kyoung Ho Ahn, Daejeon (KR); Chul Haeng Lee, Daejeon (KR); Jun Hyeok Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 344 days.

(21) Appl. No.: 16/633,115

(22) PCT Filed: Aug. 31, 2018

(86) PCT No.: PCT/KR2018/010187
§ 371 (c)(1),
(2) Date: Jan. 22, 2020

(87) PCT Pub. No.: WO2019/054677
PCT Pub. Date: Mar. 21, 2019

(65) Prior Publication Data
US 2020/0235428 A1    Jul. 23, 2020

(30) Foreign Application Priority Data

Sep. 12, 2017 (KR) .................. 10-2017-0116831
Aug. 29, 2018 (KR) .................. 10-2018-0102273

(51) Int. Cl.
*H01M 10/0565* (2010.01)
*C08F 16/18* (2006.01)
*C08F 16/32* (2006.01)
*H01M 10/0525* (2010.01)

(52) U.S. Cl.
CPC ......... *H01M 10/0565* (2013.01); *C08F 16/18* (2013.01); *C08F 16/32* (2013.01); *H01M 10/0525* (2013.01); *H01M 2300/0082* (2013.01)

(58) Field of Classification Search
CPC ......... H01M 10/0565; H01M 10/0525; H01M 2300/0082; H01M 10/058; H01M 2300/0085; H01M 10/052; H01M 10/4235; C08F 16/18; C08F 16/32; Y02E 60/10; Y02P 70/50
USPC ....................................................... 429/317
See application file for complete search history.

(56) References Cited

U.S. PATENT DOCUMENTS

| 6,180,287 B1 | 1/2001 | Watanabe et al. |
| 6,833,220 B1 | 12/2004 | Yokoyama et al. |
| 2002/0042001 A1 | 4/2002 | Lee |
| 2007/0099089 A1 | 5/2007 | Miura et al. |
| 2011/0183213 A1 | 7/2011 | Inoue et al. |
| 2011/0300450 A1 | 12/2011 | Balaji et al. |

FOREIGN PATENT DOCUMENTS

| CN | 102136601 A | 7/2011 |
| JP | H02-155173 A | 6/1990 |
| JP | H05-6764 A | 1/1993 |
| JP | 2000-306604 A | 11/2000 |
| JP | 2000306604 A * | 11/2000 |
| JP | 2002-158039 A | 5/2002 |
| JP | 2002-260440 A | 9/2002 |
| JP | 2002-260962 A | 9/2002 |
| JP | 2005-011663 A | 1/2005 |
| JP | 3852169 B2 | 11/2006 |
| JP | 4559587 B2 | 10/2010 |
| JP | 2011-150920 A | 8/2011 |
| KR | 10-1998-0057628 A | 9/1998 |
| KR | 10-2002-0053879 A | 7/2002 |
| KR | 10-0388906 B1 | 6/2003 |
| KR | 10-0538680 B1 | 2/2006 |
| KR | 10-1066061 B1 | 9/2011 |

OTHER PUBLICATIONS

Pires, J. et al., "Tris(2,2,2-trifluoroethyl) phosphite as an electrolyte additve for high-voltage lithium-ion batteries using lithium-rich layered oxide cathode", Journal of Power Sources, vol. 296 (2015) 413-425.
Extended European Search Report dated May 27, 2020 issued by the European Patent Office in corresponding European patent application No. 18855646.1.
Extended European Search Report dated May 27, 2020 issued by the European Patent Office in corresponding European patent application No. 18855646.8.
Kang et al., "Effect of Poly(ethylene glycol) dimethyl ether plasticizer on Ionic Conductivity of Cross-Linked Poly [siloxane-g-oligo(ethylene oxide)] Solid Polymer Electrolytes," Macromolecular Research, vol. 12, No. 5, pp. 431-436 (2004).

* cited by examiner

*Primary Examiner* — Gary D Harris
(74) *Attorney, Agent, or Firm* — Morgan, Lewis & Bockius LLP

(57) ABSTRACT

The present invention relates to a polymer electrolyte for a secondary battery and a lithium secondary battery including the same, and to a polymer electrolyte for a secondary battery, which includes unit A derived from a poly(ethylene oxide)-based polymer, and a lithium secondary battery including the same.

16 Claims, No Drawings

POLYMER ELECTROLYTE FOR SECONDARY BATTERY COMPRISING LITHIUM SALT AND POLYMER AND LITHIUM SECONDARY BATTERY INCLUDING THE SAME

CROSS-REFERENCES TO RELATED APPLICATIONS

This application is a U.S. national phase application, pursuant to 35 U.S.C. § 371, of PCT/KR2018/010187, filed Aug. 31, 2018, designating the United States, which claims priority to Korean Application No. 10-2017-0116831, filed Sep. 12, 2017 and Korean Application No. 10-2018-0102273, filed Aug. 29, 2018. The entire contents of the aforementioned patent applications are incorporated herein by this reference.

TECHNICAL FIELD

The present invention relates to a polymer electrolyte for a secondary battery and a lithium secondary battery including the same.

BACKGROUND ART

There is a growing demand for high performance, high stability secondary batteries as electric, electronic, communication, and computer industries have rapidly developed. Particularly, in line with miniaturization and lightweight trends of electronic (communication) devices, thin-film and miniaturized lithium secondary batteries, as core components in this field, are required.

Lithium secondary batteries may be divided into a lithium ion battery using a liquid electrolyte and a lithium polymer battery using a polymer electrolyte depending on the electrolyte used.

With respect to the lithium ion battery, it may have high capacity, but, since the liquid electrolyte containing a lithium salt is used, there may be a risk of leakage and explosion and battery design may be complicated to prepare for the risk.

In contrast, with respect to the lithium polymer battery, since a solid polymer electrolyte or a gel polymer electrolyte is used as the electrolyte, stability is improved and, simultaneously, the lithium polymer battery may be developed in various forms, for example, in the form of small or thin-film batteries.

However, the solid or gel polymer electrolyte is disadvantageous in that it has less ionic conductivity than the liquid electrolyte.

For example, with respect to polyethylene oxide used in the preparation of the polymer electrolyte, since cations of electrolyte salt are stabilized while the cations are coordinated with oxygen atoms present in the polyethylene oxide to form a complex, the cations may be present in a stable ionic state despite the fact that it is in a solid state without a solvent. However, since the polyethylene oxide has a semi-crystalline structure at room temperature, it interferes with the movement of the dissociated electrolyte salt, and, as a result, it is disadvantageous in that it has a low ionic conductivity of about $1.0 \times 10^{-8}$ S/cm at room temperature.

Thus, with respect to the secondary battery in which the solid or gel polymer electrolyte is used, since energy characteristics are degraded, it may not be suitable for commercialization.

Therefore, there is an urgent need to develop a polymer electrolyte material which may secure high ionic conductivity, processability, and mechanical strength while maintaining a solid phase.

PRIOR ART DOCUMENT

Korean Patent No. 10-0538680

DISCLOSURE OF THE INVENTION

Technical Problem

An aspect of the present invention provides a polymer electrolyte for a secondary battery having high ionic conductivity.

Another aspect of the present invention provides a composition for a polymer electrolyte for forming the polymer electrolyte for a secondary battery.

Another aspect of the present invention provides a method of preparing a secondary battery using the polymer electrolyte.

Another aspect of the present invention provides a lithium secondary battery in which electrochemical stability at high voltage and high temperature is improved by including the polymer electrolyte for a secondary battery.

Technical Solution

According to an aspect of the present invention, there is provided a polymer electrolyte for a secondary battery including:

a lithium salt and unit A derived from polymer (a) represented by Formula 1:

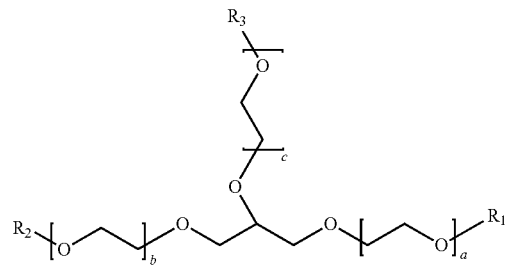

[Formula 1]

In Formula 1, $R_1$, $R_2$, and $R_3$ are each independently hydrogen or —$CH_2$—$CH$=$CH_2$, at least one of $R_1$, $R_2$, and $R_3$ is —$CH_2$—$CH$=$CH_2$, each of a, b, and c is the number of repeating units, and a, b, and c are each independently an integer of any one of 1 to 10,000.

The polymer (a) represented by Formula 1 may include at least one selected from the group consisting of polymers represented by Formulae 1a to 1c.

[Formula 1a]

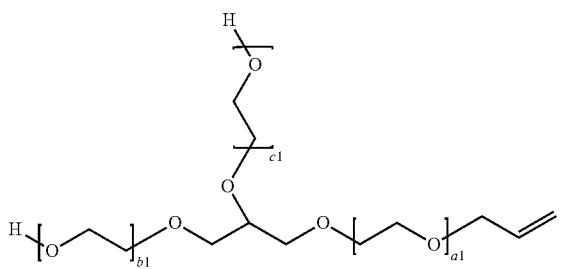

In Formula 1a,
each of a1, b1, and c1 is the number of repeating units, and
a1, b1, and c1 are each independently an integer of any one of 1 to 10,000.

[Formula 1b]

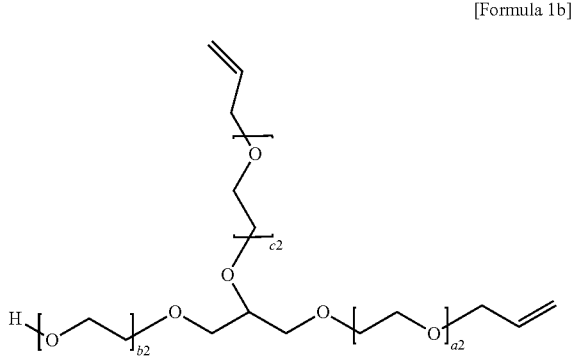

In Formula 1b,
each of a2, b2, and c2 is the number of repeating units, and
a2, b2, and c2 are each independently an integer of any one of 1 to 10,000.

[Formula 1c]

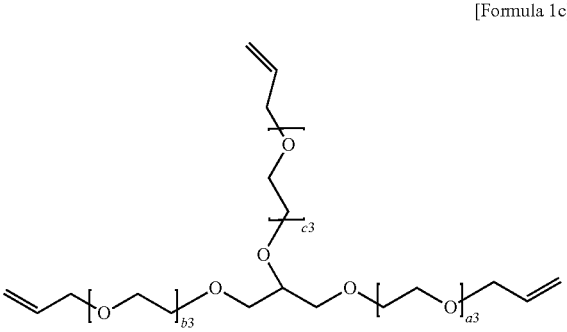

In Formula 1c,
each of a3, b3, and c3 is the number of repeating units, and
a3, b3, and c3 are each independently an integer of any one of 1 to 10,000.

In the polymer electrolyte, a weight ratio of the lithium salt to the unit A derived from the polymer (a) represented by Formula 1 may be in a range of 1:1 to 1:9, for example, 1:1 to 1:6.

The polymer electrolyte may further include an oxygen ($O_2$) inhibitor.

According to another aspect of the present invention, there is provided a composition for a polymer electrolyte which includes a lithium salt, an organic solvent, and polymer (a) represented by Formula 1.

A weight ratio of the lithium salt to the polymer (a) represented by Formula 1 may be in a range of 1:1 to 1:9, for example, 1:1 to 1:6.

The composition for a polymer electrolyte may further include a polymerization initiator.

The composition for a polymer electrolyte may further include an oxygen ($O_2$) inhibitor.

According to another aspect of the present invention, there is provided a method of preparing a secondary battery which includes:
coating the composition for a polymer electrolyte of the present invention on at least one surface of a positive electrode, a negative electrode, and a separator; and
forming a polymer electrolyte for a secondary battery by thermal curing the composition for a polymer electrolyte.

According to another aspect of the present invention, there is provided a method of preparing a secondary battery which includes:
coating the composition for a polymer electrolyte of the present invention on a base;
forming a polymer electrolyte for a secondary battery by thermal curing the composition for a polymer electrolyte;
separating the polymer electrolyte from the base; and
disposing the separated polymer electrolyte on at least one surface of a negative electrode, a positive electrode, and a separator.

According to another aspect of the present invention, there is provided a lithium secondary battery including the polymer electrolyte for a secondary battery of the present invention.

Advantageous Effects

According to the present invention, a polymer electrolyte capable of achieving excellent ionic conductivity as well as mechanical strength may be provided by including a lithium salt and unit A derived from a polymer having a specific structure. Furthermore, a lithium secondary battery having improved electrochemical stability at high voltage and high temperature may be prepared by including the polymer electrolyte.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Unless otherwise defined in the specification, the expression "molecular weight" denotes a weight-average molecular weight (Mw), and a weight-average molecular weight (Mw) of a polymer or oligomer of the present invention may be measured using gel permeation chromatography (GPC). For example, a sample having a predetermined concentration is prepared, and Alliance 4, a GPC measurement system, is then stabilized. When the system is stabilized, a standard sample and the sample are injected into the system to obtain a chromatogram, and a molecular weight may then be calculated using an analytical method (system: Alliance 4, column: Ultrahydrogel linear X2, eluent: 0.1M NaNO$_3$ (pH 7.0 phosphate buffer, flow rate: 0.1 mL/min, temp: 40° C., injection: 100 μL)).

In the present specification, ionic conductivity may be measured by an alternating current impedance method. Specifically, the ionic conductivity may be measured in a frequency range of 0.1 Hz to 100 MHz using a VMP3 measurement instrument and a precision impedance analyzer (4294A).

In the present specification, electrochemical (oxidation) stability was measured using linear sweep voltammetry (LSV). A potentiostat (EG&G; model 270A) was used as a measuring device, and measurement temperature was 60° C.

In the present invention, tensile strength was measure for electrolyte specimens, which were collectively prepared according to ASTM standard D638 (Type V specimens), at a rate of 5 mm per minute at a temperature of 25° C. and a relative humidity of about 30% using Lloyd LR-10K.

Currently, since there is less solution leakage in a secondary battery including a polymer electrolyte in comparison to a secondary battery including a liquid electrolyte solution alone as an ion transport medium, reliability and stability of the battery may be improved and, simultaneously, thinness, simplification of package, and weight reduction may be achieved. Also, since the polymer electrolyte has inherently good processability and flexibility, it is advantageous in that the formation of a laminated structure with an electrode is easy and a change in shape of a polymer electrolyte interface due to a change in volume of the electrode caused by intercalation and deintercalation of ions is possible when the polymer electrolyte is used in an electrochemical device such as a battery.

However, since the polymer electrolyte has relatively less ionic conductivity than the liquid electrolyte solution, it is disadvantageous in that battery resistance is increased due to low charge/discharge current density of the secondary battery using the polymer electrolyte at room temperature.

Thus, the present invention aims at providing a polymer electrolyte for a secondary battery having excellent ionic conductivity as well as mechanical strength and a secondary battery including the same by improving these limitations.

Hereinafter, a polymer electrolyte for a secondary battery, a composition for a polymer electrolyte for preparing the same, and a lithium secondary battery including the polymer electrolyte will be described in more detail.

Polymer Electrolyte

Specifically, in an embodiment of the present invention, provided is a polymer electrolyte including a lithium salt and unit A derived from polymer (a) represented by Formula 1 below.

[Formula 1]

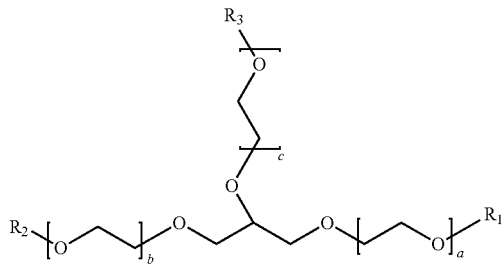

In Formula 1,
R$_1$, R$_2$, and R$_3$ are each independently hydrogen or —CH$_2$—CH═CH$_2$,
at least one of R$_1$, R$_2$, and R$_3$ is —CH$_2$—CH═CH$_2$ (i.e., all of R$_1$, R$_2$, and R$_3$ are not hydrogen),
each of a, b, and c is the number of repeating units, and
a, b, and c are each independently an integer of any one of 1 to 10,000, for example, 5 to 8,000.

(1) Lithium Salt

First, the polymer electrolyte of the present invention may include a lithium salt to enhance lithium ion transfer characteristics. The lithium salt may include Li$^+$ as a cation, and may include at least one selected from the group consisting of F$^-$, Cl$^-$, Br$^-$, I$^-$, NO$_3^-$, N(CN)$_2^-$, BF$_4^-$, ClO$_4^-$, AlO$_4^-$, AlCl$_4^-$, PF$_6^-$, SbF$_6^-$, AsF$_6^-$, BF$_2$C$_2$O$_4^-$, B(C$_2$O$_4$)$_2^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6^-$, CF$_3$SO$_3^-$, C$_4$F$_9$SO$_3^-$, CF$_3$CF$_2$SO$_3^-$, (FSO$_2$)$_2$N$^-$, CF$_3$CF$_2$(CF$_3$)$_2$CO$^-$, (CF$_3$SO$_2$)$_2$N$^-$, (SF$_5$)$_3$C$^-$, (CF$_3$SO$_2$)$_3$C$^-$, CF$_3$(CF$_2$)$_7$SO$_3^-$, CF$_3$CO$_2^-$, CH$_3$CO$_2^-$, SCN$^-$, and (CF$_3$CF$_2$SO$_2$)$_2$ N$^-$ as an anion.

The lithium salt may be used alone or may be used in a mixture of two or more thereof, if necessary.

(2) Unit A Derived from Polymer (a) Represented by Formula 1

Also, the polymer electrolyte according to the embodiment of the present invention may include unit A derived from polymer (a) represented by Formula 1. That is, the polymer electrolyte includes a polymer network which is formed by cross-linking ends (double bonds) of the polymer (a) represented by Formula 1 to each other, and the unit A denotes a polymerization repeating unit derived from the polymer (a) represented by Formula 1 which is included in the polymer network.

In the polymer electrolyte, a weight ratio of the lithium salt to the unit A derived from the polymer (a) represented by Formula 1 may be in a range of 1:1 to 1:9, particularly 1:1 to 1:6, and more particularly 1:1.5 to 1:6.

When a weight ratio of an amount of the unit A derived from the polymer (a) represented by Formula 1 with respect to one weight of the lithium salt in the polymer electrolyte is 9 or less, it is advantageous for polymer electrolyte molding, an oxidation potential may be increased, and degradation of battery performance at high temperature and high voltage may be suppressed by suppressing a decrease in mechanical strength due to the excessive amount of the unit A included. Also, ion transfer characteristics by the lithium salt in the polymer electrolyte may be improved.

Furthermore, when the weight ratio of the amount of the unit A derived from the polymer (a) represented by Formula 1 with respect to one weight of the lithium salt in the polymer electrolyte is 1 or more, the formation of a polymer matrix may not only be easy, but excellent mechanical properties may also be secured. When the weight ratio of the amount of the unit A derived from the polymer (a) represented by Formula 1 with respect to one weight of the lithium salt in the polymer electrolyte is less than 1, since a ratio of the lithium salt in the polymer electrolyte is increased, the ion transfer characteristics may be improved while lithium ion supply becomes smooth, but the mechanical properties of the polymer electrolyte may be relatively deteriorated.

The polymer (a) represented by Formula 1 may have a weight-average molecular weight (Mw) of 1,000 g/mol to 1,000,000 g/mol, particularly 5,000 g/mol to 500,000 g/mol, and more particularly 10,000 g/mol to 200,000 g/mol.

When the weight-average molecular weight of the polymer (a) represented by Formula 1 is within the above range, ion transfer capability of the polymer electrolyte may be improved and electrochemical stability may be secured.

The weight-average molecular weight (Mw) of the polymer (a) represented by Formula 1 may be measured using gel permeation chromatography (GPC). For example, a sample having a predetermined concentration is prepared, and Alliance 4, a GPC measurement system, is then stabilized. When the system is stabilized, a standard sample and the sample are injected into the system to obtain a chromatogram, and a molecular weight may then be calculated using an analytical method (system: Alliance 4, column: Ultrahydrogel linear X2, eluent: 0.1M $NaNO_3$ (pH 7.0 phosphate buffer, flow rate: 0.1 mL/min, temp: 40° C., injection: 100 μL)).

The polymer (a) represented by Formula 1 may include at least one selected from the group consisting of polymers represented by the following Formulae 1a to 1c.

[Formula 1a]

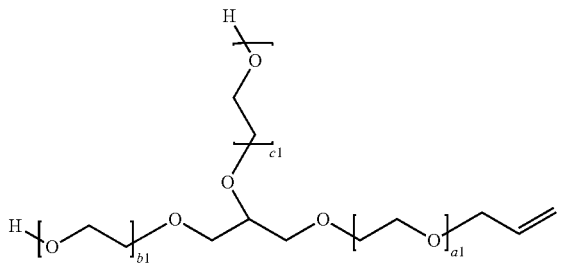

In Formula 1a, each of a1, b1, and c1 is the number of repeating units, and a1, b1, and c1 are each independently an integer of any one of 1 to 10,000, for example, 5 to 8,000.

[Formula 1b]

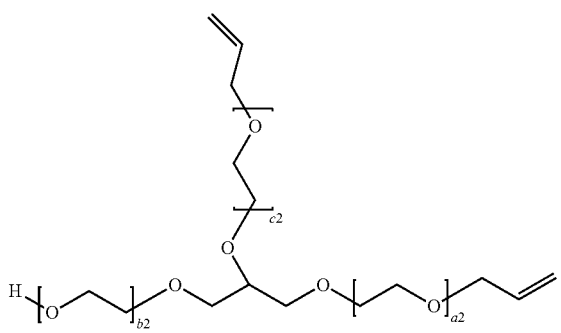

In Formula 1b, each of a2, b2, and c2 is the number of repeating units, and a2, b2, and c2 are each independently an integer of any one of 1 to 10,000, for example, 5 to 8,000.

[Formula 1c]

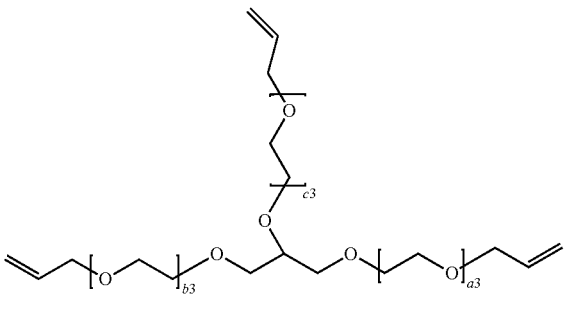

In Formula 1c, each of a3, b3, and c3 is the number of repeating units, and a3, b3, and c3 are each independently an integer of any one of 1 to 10,000, for example, 5 to 8,000.

(3) Oxygen Inhibitor

Furthermore, the polymer electrolyte according to the embodiment of the present invention may further include an oxygen ($O_2$) inhibitor.

As a representative example, the oxygen inhibitor may include tris(2,2,2-trifluoroethyl)phosphite.

The oxygen inhibitor may be included in an amount of 0.1 wt % to 10 wt % based on a total weight of solid content in the polymer electrolyte. When the oxygen inhibitor is included in the above content ratio, since the oxygen inhibitor may have an effect of inhibiting oxygen generation and an effect of preventing a side reaction, cross-linking polymerization of the polymer (a) may be more efficiently improved.

(4) Unit B

Also, the polymer electrolyte according to the embodiment of the present invention may further include unit B.

The unit B may be derived from compounds containing a polymerizable functional group for crosslinking in the molecule.

As a representative example, the compound containing a polymerizable functional group may include a multi-functional (meth)acrylate-based compound containing at least one acrylate group, or a compound having at least one polymerizable functional group selected from the group consisting of a vinyl group, an epoxy group, an ether group, an allyl group, and a (meth)acrylic group. When the number of polymerizable functional groups in the compound is two or more, the polymerizable functional groups may have the same structure or may be different.

Specifically, typical examples of the compound containing a polymerizable functional group may be methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, 2,2,2-trifluoroethyl acrylate, 2,2,2-trifluoroethyl methacrylate, 2,2,3,3-tetrafluoropropyl acrylate, 2,2,3,3-tetrafluoropropyl methacrylate, tetraethylene glycol diacrylate, polyethylene glycol diacrylate (molecular weight: 50 to 20,000), 1,4-butanediol diacrylate, 1,6-hexandiol diacrylate, trimethylolpropane triacrylate, trimethylolpropane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, and dipentaerythritol hexaacrylate.

In addition, the compound containing a polymerizable functional group may include at least one compound selected from the group consisting of a phosphate-based compound, a pyrophosphate-based compound, poly(ethylene glycol) diglycidylether, 1,5-hexadiene diepoxide, glycerol propoxylate triglycidyl ether, vinylcyclohexene dioxide, 1,2,7,8-diepoxyoctane, 4-vinylcyclohexene dioxide, butyl glycidyl ether, diglycidyl 1,2-cyclohexanedicarboxylate, ethylene glycol diglycidyl ether, glycerol triglycidyl ether, and glycidyl methacrylate.

The unit B may be included in an amount of 1 part by weight to 100 parts by weight, particularly 1 part by weight to 50 parts by weight, and more particularly 1 part by weight to 30 parts by weight based on 100 parts by weight of the unit A.

When the unit B is included in the above content ratio, since mechanical strength may be secured and, simultaneously, oxidation potential window and ion transfer capability may be further improved, the electrochemical stability of the secondary battery may be improved.

In this case, the unit B may be included in the form of a polymer network cross-linked with the unit A, or may be included in the form of a polymer network composed of only the unit B.

The polymer electrolyte of the present invention may be a free-standing polymer electrolyte including a lithium salt and the unit A derived from the polymer (a) represented by Formula 1.

Also, the polymer electrolyte of the present invention may be a free-standing polymer electrolyte including a lithium salt, the unit A derived from the polymer (a) represented by Formula 1, and, selectively, the unit B.

The polymer electrolyte of the present invention may have an ionic conductivity of $1.0 \times 10^{-4}$ S/cm or more, for example, $2.7 \times 10^{-4}$ S/cm to $3.8 \times 10^{-4}$ S/cm.

The ionic conductivity may be measured by an alternating current impedance method.

The ionic conductivity may be measured in a frequency range of 0.1 Hz to 100 MHz using a VMP3 measurement instrument and a precision impedance analyzer (4294A).

Composition for Polymer Electrolyte

Also, in the present invention, provided is a composition for a polymer electrolyte which includes a lithium salt, an organic solvent, and the polymer (a) represented by Formula 1.

(1) Lithium Salt and Polymer (a) Represented by Formula 1

First, in a method of the present invention, since descriptions of the lithium salt and polymer (a) represented by Formula 1 included in the composition for a polymer electrolyte overlap with those described above, the descriptions thereof will be omitted.

However, regarding amounts of the lithium salt and the polymer (a) represented by Formula 1, a weight ratio of the lithium salt to the polymer (a) represented by Formula 1 in the composition for a polymer electrolyte may be in a range of 1:1 to 1:9, particularly 1:1 to 1:6, and more particularly 1:2 to 1:4.

When the polymer (a) represented by Formula 1 and the lithium salt in the composition for a polymer electrolyte are included in the above ratio, a desired amount of unit A may be included in the polymer electrolyte after drying and curing, and, accordingly, a polymer electrolyte securing excellent mechanical strength and ionic conductivity may be prepared. Specifically, when the weight ratio of the polymer (a) represented by Formula 1 with respect to one weight of the lithium salt is 9 or less, it is advantageous for polymer electrolyte molding, the oxidation potential may be increased, and the degradation of battery performance at high temperature and high voltage may be suppressed by suppressing the decrease in mechanical strength due to the excessive amount of the polymer (a) included. Also, when the weight ratio of the polymer (a) represented by Formula 1 with respect to one weight of the lithium salt is 1 or more, the formation of the polymer matrix may not only be easy, but excellent mechanical properties may also be secured. When the weight ratio of the polymer (a) represented by Formula 1 with respect to one weight of the lithium salt is less than 1, since a ratio of the lithium salt is increased, the ion transfer characteristics may be improved while the lithium ion supply becomes smooth, but the mechanical properties may be relatively deteriorated.

In the polymer electrolyte of the present invention, one or more polymers represented by Formula 1, specifically, one or more polymers represented by Formulae 1a to 1c may be appropriately mixed and used depending on the effect desired to be achieved.

That is, with respect to the polymer represented by Formula 1c containing acrylate end groups, cross-linking performance is better than those of the polymers represented by Formula 1a or 1b. Thus, when the improved mechanical properties and an improvement in stability at high voltage are desired to be achieved, a polymer electrolyte, in which a dense polymer network structure is formed, may be prepared by increasing an amount of the polymer represented by Formula 1c. Also, with respect to the polymer represented by Formula 1a containing one acrylate end group, cross-linking performance is inferior to those of the polymers represented by Formula 1b or 1c. Thus, in a case in which an amount of the polymer represented by Formula 1a is large, a polymer electrolyte having a relatively loose polymer network structure is formed in comparison to a case where the amount of the polymer represented by Formula 1c is large. In this case, since the mechanical properties of the polymer electrolyte are relatively deteriorated, but the movement of lithium ions is facilitated, an effect of improving the ionic conductivity may be achieved.

(2) Organic Solvent

Also, the organic solvent used in the preparation of the composition for a polymer electrolyte is not particularly limited as long as it may minimize decomposition due to an oxidation reaction during charge and discharge of the secondary battery, but both a volatile organic solvent having a low boiling point and a nonvolatile organic solvent may be used so that the organic solvent may be easily removed.

Typical examples of the organic solvent may be a single material selected from the group consisting of N,N'-dimethylacetamide, N-methyl-2-pyrrolidone (hereinafter, abbreviated as "NMP"), dimethyl sulfoxide (DMSO), N,N-dimethylformamide (DMF), acetonitrile (AN), propylene carbonate (PC), ethylene carbonate (EC), butylene carbonate (BC), dimethyl carbonate (DMC), diethyl carbonate (DEC), ethylmethyl carbonate (EMC), fluoroethylene carbonate (FEC), γ-butyrolactone (GBL), 1,2-dimethoxy ethane, tetrahydroxyfuran (THF), 2-methyl tetrahydrofuran, 1,3-dioxolane (DOL), 1,4-dioxane, formamide, dimethylformamide, dioxolane, acetonitrile, nitromethane, methyl formate, ethyl acetate (EA), ethyl propionate (EP), methyl acetate (MA), methyl propionate (MP), dimethoxyethane (DME), phosphate triester, diethyl ether, trimethoxy methane, triglyme, tetraglyme (TEGDME), sulfolane, methyl sulfolane, and 1,3-dimethyl-2-imidazolidinone, or a mixture of two or more thereof.

Specifically, in order to facilitate the removal of the organic solvent, it is desirable that the organic solvent includes an organic solvent having a low boiling point, such as acetonitrile, or a highly volatile organic solvent such as N-methyl-2-pyrrolidone.

An amount of the organic solvent used is not particularly limited as long as the organic solvent is used in an amount such that the polymer (a) represented by Formula 1 and the lithium salt are uniformly mixed and the mixture may be coated to a uniform thickness, but the organic solvent is preferably used in an amount as small as possible so as to facilitate the removal after coating the composition for a polymer electrolyte.

Specifically, the organic solvent may be used in an amount of about 5 parts by weight to 1,000 parts by weight, particularly 30 parts by weight to 500 parts by weight, and more particularly 30 parts by weight to 200 parts by weight based on 100 parts by weight of a total solid content including the lithium salt and the polymer (a) represented by Formula 1. When the organic solvent is used in an amount of 30 parts by weight or less to prepare a composition for a polymer electrolyte in a thick slurry state, fluidity may be increased by increasing solubility by slightly applying heat at a temperature of 45° C. or less to facilitate coating.

When the amount of the organic solvent used is within the above range, since the composition for a polymer electrolyte may be uniformly coated to a sufficient thickness and the organic solvent may be easily removed during the preparation of the polymer electrolyte, a reduction in the mechanical strength of the polymer electrolyte due to the residual organic solvent may be prevented.

(3) Polymer Initiator

Furthermore, the composition for a polymer electrolyte of the present invention may further selectively include a polymerization initiator to improve a polymerization effect.

A conventional polymerization initiator known in the art may be used as the polymerization initiator. For example, at least one selected from the group consisting of an ultraviolet (UV) polymerization initiator, a photopolymerization initiator, and a thermal polymerization initiator may be used, and, specifically, the UV polymerization initiator or thermal polymerization initiator may be used.

Specifically, as a representative example, the UV polymerization initiator may include at least one selected from the group consisting of 2-hydroxy-2-methylpropiophenone, 1-hydroxy-cyclohexylphenyl-ketone, benzophenone, 2-hydroxy-1-[4-(2-hydroxyethoxy)phenyl]-2-methyl-1-propanone, oxy-phenylacetic acid 2-[2-oxo-2-phenyl-acetoxyethoxy]-ethyl ester, oxy-phenyl-acetic 2-[2-hydroxyethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphosphine oxide, bis(eta 5-2,4-cyclopentadiene-1-yl), bis[2,6-difluoro-3-(1H-pyrrol-1-yl) phenyl]titanium, 4-isobutylphenyl-4'-methylphenyl iodonium, hexafluorophosphate, and methyl benzoylformate.

Also, as a representative example, the photopolymerization initiator or the thermal polymerization initiator may include at least one selected from the group consisting of benzoyl peroxide, acetyl peroxide, dilauryl peroxide, di-tert-butyl peroxide, t-butyl peroxy-2-ethyl-hexanoate, cumyl hydroperoxide, hydrogen peroxide, 2,2'-azobis(2-cyanobutane), 2,2'-azobis(methylbutyronitrile), 2,2'-azobis(iso-butyronitrile) (AIBN), and 2,2'-azobisdimethyl-valeronitrile (AMVN).

The polymerization initiator forms a radical by being dissociated by UV or heat at a temperature of 30° C. to 100° C. in the battery or by being dissociated by light at room temperature (5° C. to 30° C.), and cross-linking of the polymer (a) represented by Formula 1 is formed by free radical polymerization so that a polymer electrolyte may be formed.

When a polymerization initiator is included during the preparation of the composition for a polymer electrolyte, the polymerization initiator may be used in an amount of 0.1 part by weight or more based on 100 parts by weight of the polymer (a). That is, the polymerization reaction between the polymers (a) represented by Formula 1 may be performed more smoothly and quickly when the polymerization initiator is included in an amount of 0.1 part by weight or more.

Meanwhile, when a polymerization initiator is included during the preparation of the polymer electrolyte, the polymerization initiator is usually decomposed to initiate a chain polymerization reaction when drying and curing are performed on a polymer composition, and the polymerization initiator is then removed while a part of the polymerization initiator is converted into gas, wherein a trace amount of some residues of the polymerization initiator remaining without decomposition and removal may also be included in the prepared polymer electrolyte.

Thus, in order to prevent a side reaction and an increase in resistance caused by the polymer initiator, the use of an excessive amount of the polymerization initiator is avoided, and the polymerization initiator may specifically be used in an amount of 10 parts by weight or less, particularly 5 parts by weight or less, and more particularly 2 parts by weight or less based on 100 parts by weight of the polymer (a).

That is, when the polymerization initiator is included in an amount of 10 parts by weight or less, for example, 5 parts by weight or less, since polymerization rate may be controlled in the polymer electrolyte, a disadvantage that the unreacted polymerization initiator remains and adversely affects the battery performance later may be prevented.

(4) Oxygen Inhibitor

Also, the composition for a polymer electrolyte of the present invention may further selectively include an oxygen ($O_2$) inhibitor to inhibit the generation of oxygen during the polymerization and increase the polymerization effect.

As a representative example, the oxygen inhibitor may include tris(2,2,2-trifluoroethyl)phosphite as described above.

The oxygen inhibitor may be included in an amount of 0.1 wt % to 10 wt % based on a total weight of the composition for a polymer electrolyte. When the oxygen inhibitor is included in the above content ratio, since the oxygen inhibitor may have the effect of inhibiting oxygen generation and the effect of preventing a side reaction, cross-linking polymerization may be more efficiently performed.

(5) Compound having Polymerizable Functional Group

Furthermore, the composition for a polymer electrolyte of the present invention may further selectively include a compound having a polymerizable functional group.

Since descriptions of the compound having a polymerizable functional group overlap with those described above, the descriptions thereof will be omitted.

The compound having a polymerizable functional group may be included in an amount of 1 part by weight to 100 parts by weight, particularly 5 parts by weight to 50 parts by weight, and more particularly 5 parts by weight to 30 parts by weight based on 100 parts by weight of the polymer (a).

When the compound having a polymerizable functional group is included in the above content ratio, the mechanical strength and oxidation potential window may be further improved.

Method of Preparing Secondary Battery

Furthermore, in an embodiment of the present invention, provided is a method of preparing a secondary battery which includes:

coating the composition for a polymer electrolyte of the present invention on at least one surface of a negative electrode, a positive electrode, and a separator; and forming the polymer electrolyte of the present invention by thermal curing the composition for a polymer electrolyte.

Also, in an embodiment of the present invention, provided is a method of preparing a secondary battery which includes:

coating the composition for a polymer electrolyte on a base;

forming the polymer electrolyte of the present invention by thermal curing the composition for a polymer electrolyte;

separating the polymer electrolyte film from the base; and disposing the polymer electrolyte film on at least one surface of a negative electrode, a positive electrode, and a separator.

In the method of the present invention, the coating of the composition for a polymer electrolyte on the at least one surface of the negative electrode, the positive electrode, and the separator, or the coating of the composition for a polymer electrolyte on the base may be performed by using a conventional solution casting method known in the art.

In this case, the base may include a glass substrate and a polyethylene terephthalate (PET), Teflon, or fluorinated ethylene propylene copolymer (FEP) film.

Also, in the method of the present invention, the curing of the composition for a polymer electrolyte may be performed by performing a thermal process, and, in addition, a UV curing process may also be performed.

Specifically, the curing may be performed in a temperature range of 40° C. to 70° C. for 5 hours to 24 hours under an inert condition.

As described above, if the curing is performed in an inert atmosphere, since the reaction of radicals with oxygen, as a radical scavenger, in the atmosphere is essentially blocked, the extent of reaction may be increased to such an extent that the unreacted polymer is almost absent. Thus, it is possible to prevent a reduction in mechanical strength and ion transfer ability caused by a large amount of the unreacted polymer remaining in the battery. Gas having low reactivity known in the art may be used for the inert atmosphere, and, particularly, at least one inert gas selected from the group consisting of nitrogen, argon, helium and xenon may be used.

A polymer electrolyte having improved mechanical strength may be prepared while the polymers (a) represented by Formula 1 are cross-linked with each other by the curing.

The polymer electrolyte of the present invention may be a free-standing polymer electrolyte including the lithium salt and the unit A derived from the polymer (a) represented by Formula 1.

Lithium Secondary Battery

Also, in an embodiment of the present invention, provided is a lithium secondary battery including the polymer electrolyte for a secondary battery of the present invention. The lithium secondary battery may be prepared by the above-described method of preparing a secondary battery.

The polymer electrolyte is prepared by polymerization of the composition for a polymer electrolyte of the present invention, wherein a thickness of the electrolyte may be in a range of about 0.5 μm to about 300 μm in consideration of the ionic conductivity. When the thickness of the electrolyte is 0.5 μm or more, strength of a film may be secured, and, when the thickness is 300 μm or less, since a proton ($H^+$), as an ion transporter, may easily pass through the film, an increase in volume for each secondary battery stack is prevented, and thus, a high-performance secondary battery may be prepared.

The positive electrode and the negative electrode used in the preparation of the lithium secondary battery of the present invention may be prepared by a conventional method.

First, the positive electrode may be prepared by forming a positive electrode material mixture layer on a positive electrode collector. The positive electrode material mixture layer may be formed by coating the positive electrode collector with a positive electrode slurry including a positive electrode active material, a binder, a conductive agent, and a solvent, and then drying and rolling the coated positive electrode collector.

The positive electrode collector is not particularly limited so long as it has high conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, and the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.).

The positive electrode active material may be included in an amount of 80 wt % to 99 wt %, for example, 85 wt % to 95 wt % based on a total weight of solid content in the positive electrode slurry.

When the amount of the positive electrode active material is 80 wt % or less, since energy density is decreased, capacity may be reduced.

The binder is a component that assists in the binding between the active material and the conductive agent and in the binding with the current collector, and the binder is commonly added in an amount of 1 wt % to 30 wt % based on the total weight of the solid content in the positive electrode active material slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the solid content in the positive electrode active material slurry.

Any conductive agent may be used without particular limitation so long as it has conductivity without causing adverse chemical changes in the battery, and, for example, a conductive material, such as: carbon powder such as carbon black, acetylene black (or Denka black), Ketjen black, channel black, furnace black, lamp black, and thermal black; graphite powder such as natural graphite having a highly developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 60 wt %, for example, 20 wt % to 50 wt %.

The negative electrode may be prepared by forming a negative electrode material mixture layer on a negative electrode collector. The negative electrode material mixture layer may be formed by coating the negative electrode collector with a negative electrode active material slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material. The negative electrode collector may be used in various shapes such as a film, a sheet, a foil, a net, a porous body, a foam body, a non-woven fabric body, and the like.

Furthermore, the negative electrode active material may include a single material selected from the group consisting of a lithium-containing titanium composite oxide (LTO); a carbon-based material such as non-graphitizable carbon and graphite-based carbon; a complex metal oxide such as $Li_xFe_2O_3$ ($0 \leq x \leq 1$), $Li_xWO_2$ ($0 < x < 1$), and $Sn_xMe_{1-x}Me'_yO_z$ (Me: manganese (Mn), iron (Fe), lead (Pb), or germanium (Ge); Me': aluminum (Al), boron (B), phosphorus (P), silicon (Si), Groups I, II and III elements of the periodic table, or halogen; $0 < x \leq 1$; $1 \leq y \leq 3$; $1 \leq z \leq 8$); a lithium metal; a lithium alloy; a silicon-based alloy; a tin-based alloy; a metal oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; and a conductive polymer, such as polyacetylene, or a mixture of two or more thereof.

The negative electrode active material may be included in an amount of 80 wt % to 99 wt % based on a total weight of solid content in the negative electrode active material slurry.

The binder is a component that assists in the binding between the conductive agent, the active material, and the current collector, and the binder is commonly added in an amount of 1 wt % to 30 wt % based on the total weight of the solid content in the negative electrode active material slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, and the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as N-methyl-2-pyrrolidone (NMP) and alcohol, and may be used in an amount such that desirable viscosity is obtained when the negative electrode active material as well as selectively the binder and the conductive agent are included. For example, the solvent may be included in an amount such that a concentration of the solid content in the slurry including the negative electrode active material as well as selectively the binder and the conductive agent is in a range of 50 wt % to 75 wt %, for example, 50 wt % to 65 wt %.

The lithium secondary battery of the present invention may further include a separator, if necessary.

The separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

The lithium secondary battery of the present invention may be prepared by disposing the polymer electrolyte film of the present invention on at least one surface of the negative electrode, the positive electrode, and the separator and then injecting a liquid electrolyte solution.

Also, the lithium secondary battery of the present invention may be an all solid-ion battery including the polymer electrolyte in the form of a solid. In this case, the separator may not be included in the secondary battery.

A shape of the lithium secondary battery of the present invention is not particularly limited, but the lithium secondary battery may be used in various forms, such as a cylindrical type, a prismatic type, a pouch type, or a coin type, depending on the purpose. The lithium secondary battery according to the embodiment of the present invention may be a pouch-type secondary battery.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Electrode Preparation)

A positive electrode active material slurry having a solid content of 90 wt % was prepared by adding 94 wt % of a 4.2 V-class LiCoO$_2$ compound as a positive electrode active material, 4 wt % of carbon black as a conductive agent, and 2 wt % of polyvinylidene fluoride (PVDF), as a binder component, to N-methyl-2-pyrrolidone (NMP) as a solvent.

A surface of a 20 μm thick aluminum (Al) thin film was coated with the positive electrode active material slurry to a thickness of 10 μm and then dried to prepare a positive electrode plate.

A copper (Cu) thin film was coated with lithium metal and then rolled to prepare a 20 μm thick negative electrode plate.

(Polymer Electrolyte Preparation)

40 g of the polymer represented by Formula 1a (weight-average molecular weight (Mw)=100,000, a1=760, b1=760, and c1=760), 10 g of a lithium salt (LiPF$_6$), and 0.4 g of an UV polymerization initiator (2-hydroxy-2-methylpropiophenone) were added to 49.6 g of NMP and mixed to prepare a composition for a polymer electrolyte.

After at least one surface of the positive electrode plate was coated with the composition for a polymer electrolyte and dried, UV curing was performed at a temperature of 65° C. for 12 hours to prepare a polymer electrolyte film having a thickness of 50 μm (see Table 1 below).

(Secondary Battery Preparation)

An electrode assembly was prepared by disposing a polyolefin-based separator (thickness: 20 μm) between the prepared negative electrode and positive electrode including the polymer electrolyte, the electrode assembly was accommodated in a pouch-type battery case, and a liquid electrolyte solution, in which 1 M LiPF$_6$ was included in a solvent in which EC and DEC were mixed in a ratio of 5:5, was injected thereinto to prepare a 4.2 V-class secondary battery (full cell).

Example 2

A polymer electrolyte film and a secondary battery including the same were prepared in the same manner as in Example 1 except that the polymer represented by Formula 1b (weight-average molecular weight (Mw)=100,000, a2=760, b2=760, and c2=760), instead of the polymer represented by Formula 1a, was used during the preparation of the polymer electrolyte (see Table 1 below).

Example 3

A polymer electrolyte film and a secondary battery including the same were prepared in the same manner as in Example 1 except that the polymer represented by Formula 1c (weight-average molecular weight (Mw)=100,000, a3=760, b3=760, and c3=760), instead of the polymer represented by Formula 1a, was used during the preparation of the polymer electrolyte (see Table 1 below).

Example 4

A polymer electrolyte film and a secondary battery including the same were prepared in the same manner as in Example 1 except that the polymer represented by Formula 1b (weight-average molecular weight (Mw)=50,000, a2=380, b2=380, and c2=380), instead of the polymer represented by Formula 1a, was used during the preparation of the polymer electrolyte (see Table 1 below).

Example 5

A polymer electrolyte film and a secondary battery including the same were prepared in the same manner as in Example 2 except that 39.6 g of the polymer represented by Formula 1b, 9.9 g of LiPF$_6$, 0.396 g of a polymerization initiator (2-hydroxy-2-methylpropiophenone), and 1 g of an oxygen inhibitor (tris(2,2,2-trifluoroethyl)phosphite) were added to 49.104 g of NMP and mixed to prepare a composition for a polymer electrolyte during the preparation of the polymer electrolyte (see Table 1 below).

Example 6

A polymer electrolyte film and a secondary battery including the same were prepared in the same manner as in Example 1 except that 20 g of the polymer represented by Formula 1b (weight-average molecular weight (Mw)=100,000, a2=760, b2=760, and c2=760) and 20 g of the polymer represented by Formula 1c (weight-average molecular weight (Mw)=100,000, a3=760, b3=760, and c3=760), instead of the polymer represented by Formula 1a, were added during the preparation of the polymer electrolyte (see Table 1 below).

Example 7

A polymer electrolyte film and a secondary battery including the same were prepared in the same manner as in Example 5 except that the polymer represented by Formula 1c (weight-average molecular weight (Mw)=1,000, a3=8, b3=8, and c3=8), instead of the polymer represented by Formula 1b, was used during the preparation of the polymer electrolyte (see Table 1 below).

Example 8

A polymer electrolyte film and a secondary battery including the same were prepared in the same manner as in Example 1 except that 40 g of the polymer represented by Formula 1b (weight-average molecular weight (Mw)=1,000,000, a2=7,576, b2=7,576, and c2=7,576), 20 g of $LiPF_6$, and 0.4 g of a polymerization initiator (2-hydroxy-2-methylpropiophenone) were added to 39.6 g of NMP and mixed to prepare a composition for a polymer electrolyte during the preparation of the polymer electrolyte (see Table 1 below).

Example 9

A polymer electrolyte film and a secondary battery including the same were prepared in the same manner as in Example 1 except that 60 g of the polymer represented by Formula 1a (weight-average molecular weight (Mw)=20,000, a1=151, b1=150, and c1=150), 10 g of $LiPF_6$, and 0.6 g of a polymerization initiator (2-hydroxy-2-methylpropiophenone) were added to 29.4 g of NMP and mixed to prepare a composition for a polymer electrolyte during the preparation of the polymer electrolyte (see Table 1 below).

Example 10

A polymer electrolyte film and a secondary battery including the same were prepared in the same manner as in Example 1 except that 25 g of the polymer represented by Formula 1a (weight-average molecular weight (Mw)=100,000, a1=760, b1=760, and c1=760), 25 g of the polymer represented by Formula 1b (weight-average molecular weight (Mw)=100,000, a2=760, b2=760, and c2=760), 25 g of the polymer represented by Formula 1c (weight-average molecular weight (Mw)=100,000, a3=760, b3=760, and c3=760), 18.75 g of $LiPF_6$, and 0.75 g of a polymerization initiator (2-hydroxy-2-methylpropiophenone) were added to 5.5 g of NMP and mixed while applying heat at a temperature of 45° C. to prepare a composition for a polymer electrolyte during the preparation of the polymer electrolyte (see Table 1 below).

Example 11

A polymer electrolyte film and a secondary battery including the same were prepared in the same manner as in Example 1 except that a polymerization initiator was not added, and 40 g of the polymer represented by Formula 1b and 10 g of $LiPF_6$ were added to 50 g of NMP and mixed to prepare a composition for a polymer electrolyte during the preparation of the polymer electrolyte (see Table 1 below).

Example 12

25 g of the polymer represented by Formula 1a (weight-average molecular weight (Mw)=100,000, a1=760, b1=760, and c1=760), 25 g of $LiPF_6$, and 0.4 g of an UV polymerization initiator (2-hydroxy-2-methylpropiophenone) were added to 49.6 g of NMP and mixed to prepare a composition for a polymer electrolyte.

After one surface of the positive electrode plate was coated with the composition for a polymer electrolyte and dried, UV curing was performed to prepare a polymer electrolyte film having a thickness of 50 μm (see Table 1 below).

Example 13

45 g of the polymer represented by Formula 1a (weight-average molecular weight (Mw)=100,000, a=760, b1=760, and c1=760), 5 g of $LiPF_6$, and 0.4 g of an UV polymerization initiator (2-hydroxy-2-methylpropiophenone) were added to 49.6 g of NMP and mixed to prepare a composition for a polymer electrolyte.

After one surface of the positive electrode plate was coated with the composition for a polymer electrolyte and dried, UV curing was performed to prepare a polymer electrolyte film having a thickness of 50 μm (see Table 1 below).

Comparative Example 1

A polymer electrolyte film and a secondary battery including the same were prepared in the same manner as in Example 1 except that linear polyethylene oxide (L-PEO) was included instead of the polymer represented by Formula 1 during the preparation of the polymer electrolyte (see Table 1 below).

Comparative Example 2

A polymer electrolyte film and a secondary battery including the same were prepared in the same manner as in Example 1 except that 5 g of the polymer represented by the following Formula 2 and 1.25 g of $LiPF_6$ were added to 93.75 g of NMP and mixed to prepare a composition for a polymer electrolyte during the preparation of the polymer electrolyte.

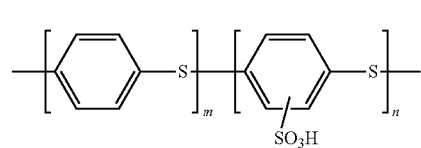

[Formula 2]

In Formula 2,
m is 2,800, and n is an integer of 1,200.

TABLE 1

| | Polymer composition | | | | | | | Polymer electrolyte |
|---|---|---|---|---|---|---|---|---|
| | Organic solvent | Lithium salt | Polymer (a) represented by Formula 1 | | Weight ratio of | Polymerization initiator | Oxygen inhibitor | Weight ratio of |
| | Amount added (g) | Amount added (g) | Formula | Molecular weight | Amount added (g) | lithium salt:polymer (a) | Amount added (g) | Amount added (g) | lithium salt:unit (A) |
| Example 1 | 49.6 | 10 | 1a | 100,000 | 40 | 1:4 | 0.4 | — | 20:80 |
| Example 2 | 49.6 | 10 | 1b | 100,000 | 40 | 1:4 | 0.4 | — | 20:80 |
| Example 3 | 49.6 | 10 | 1c | 100,000 | 40 | 1:4 | 0.4 | — | 20:80 |
| Example 4 | 49.6 | 10 | 1b | 50,000 | 40 | 1:4 | 0.4 | — | 20:80 |
| Example 5 | 49.104 | 9.9 | 1b | 100,000 | 39.6 | 1:4 | 0.396 | 1 | 22:78 |
| Example 6 | 49.6 | 10 | 1b | 100,000 | 20 | 1:4 | 0.4 | — | 20:80 |
| | | | 1c | 100,000 | 20 | | | | |
| Example 7 | 49.104 | 9.9 | 1c | 1,000 | 39.6 | 1:4 | 0.396 | 1 | 22:78 |
| Example 8 | 39.6 | 20 | 1b | 1,000,000 | 40 | 1:2 | 0.4 | — | 34:66 |
| Example 9 | 29.4 | 10 | 1a | 20,000 | 60 | 1:6 | 0.6 | — | 15:85 |
| Example 10 | 5.5 | 18.75 | 1a | 100,000 | 25 | 1:4 | 0.75 | — | 20:80 |
| | | | 1b | 100,000 | 25 | | | | |
| | | | 1c | 100,000 | 25 | | | | |
| Example 11 | 50 | 10 | 1b | 100,000 | 40 | 1:4 | — | — | 20:80 |
| Example 12 | 49.6 | 25 | 1a | 100,000 | 25 | 1:1 | 0.4 | — | 50:50 |
| Example 13 | 49.6 | 5 | 1a | 100,000 | 45 | 1:9 | 0.4 | — | 10:90 |
| Comparative Example 1 | 49.6 | 10 | L-PEO | 100,000 | 40 | | 0.4 | — | 20:80 |
| Comparative Example 2 | 93.75 | 1.25 | 2 | 500,000 | 5 | | — | — | 20:80 |

EXPERIMENTAL EXAMPLES

Experimental Example 1

Ionic Conductivity Measurement

A circular gold (Au) electrode having a diameter of 1 mm was coated with the polymer electrolytes prepared in Examples 1 to 13 and the polymer electrolytes prepared in Comparative Examples 1 and 2 using a sputtering method, and ionic conductivity was then measured according to temperature by using an alternating current impedance method. The ionic conductivity was measured in a frequency range of 0.1 Hz to 100 MHz using a VMP3 measurement instrument and a precision impedance analyzer (4294A). The measurement results are presented in Table 2 below.

TABLE 2

| | Ionic conductivity (S/cm) |
|---|---|
| Example 1 | $3.05 \times 10^{-4}$ |
| Example 2 | $2.86 \times 10^{-4}$ |
| Example 3 | $2.75 \times 10^{-4}$ |
| Example 4 | $2.88 \times 10^{-4}$ |
| Example 5 | $2.96 \times 10^{-4}$ |
| Example 6 | $2.8 \times 10^{-4}$ |
| Example 7 | $2.78 \times 10^{-4}$ |
| Example 8 | $2.95 \times 10^{-4}$ |
| Example 9 | $3.01 \times 10^{-4}$ |
| Example 10 | $2.82 \times 10^{-4}$ |
| Example 11 | $3.80 \times 10^{-4}$ |
| Example 12 | $5.75 \times 10^{-4}$ |
| Example 13 | $1.02 \times 10^{-4}$ |
| Comparative Example 1 | $3.10 \times 10^{-5}$ |
| Comparative Example 2 | $7.8 \times 10^{-8}$ |

As illustrated in Table 2, with respect to the polymer electrolytes of Examples 1 to 13 of the present invention, it may be understood that ionic conductivities thereof were mostly excellent at about $1.02 \times 10^{-4}$ or more.

In contrast, ionic conductivity of the polymer electrolyte of Comparative Example 1 prepared from the linear polyethylene oxide (L-PEO) was $3.10 \times 10^{-5}$, and ionic conductivity of the polymer electrolyte of Comparative Example 2 prepared from the polymer represented by Formula 2 was $7.8 \times 10^{-8}$, such that it may be understood that the ionic conductivities thereof were less than those of the polymer electrolytes of Examples 1 to 13.

Experimental Example 2

Electrochemical Stability Test at High Temperature

Electrochemical (oxidation) stabilities of the secondary batteries prepared in Examples 1 to 13 and the secondary battery prepared in Comparative Example 1 were measured using linear sweep voltammetry (LSV). A potentiostat (EG&G, model 270A) was used as a measuring device, and measurement temperature was 60° C. The results thereof are presented in Table 3 below.

TABLE 3

| | Oxidation stability (V) @60° C. |
|---|---|
| Example 1 | 4.91 |
| Example 2 | 4.95 |
| Example 3 | 4.97 |
| Example 4 | 4.94 |
| Example 5 | 4.99 |
| Example 6 | 4.97 |
| Example 7 | 5.10 |
| Example 8 | 4.92 |
| Example 9 | 4.98 |
| Example 10 | 4.95 |
| Example 11 | 4.60 |
| Example 12 | 4.68 |
| Example 13 | 5.00 |
| Comparative Example 1 | 3.90 |

As illustrated in Table 3, since the secondary batteries prepared in Examples 1 to 13 of the present invention had an oxidation initiation voltage of about 4.60 V or more, it was confirmed that the secondary batteries prepared in Examples 1 to 13 exhibited excellent electrochemical stabilities.

In contrast, the secondary battery of Comparative Example 1 prepared from the linear polyethylene oxide (L-PEO) had an oxidation initiation voltage of 3.90 V, such that it may be understood that the oxidation initiation voltage thereof was less than those of the secondary batteries of Examples 1 to 13.

Form these results, it may be confirmed that the oxidation stabilities of the secondary batteries of Examples 1 to 13 including the polymer electrolyte of the present invention were improved in comparison to that of the secondary battery of Comparative Example 1.

Experimental Example 3

Tensile Strength Evaluation

Specimens of the polymer electrolytes prepared in Examples 1 to 13 and the polymer electrolytes of Comparative Examples 1 and 2 were collectively prepared according to ASTM standard D638 (Type V specimens), and tensile strengths were measured at a rate of 5 mm per minute at a temperature of 25° C. and a relative humidity of about 30% using Lloyd LR-10K. The results thereof are presented in Table 4 below.

TABLE 4

|  | Tensile strength (MPa) |
| --- | --- |
| Example 1 | 13 |
| Example 2 | 25 |
| Example 3 | 38 |
| Example 4 | 23 |
| Example 5 | 28 |
| Example 6 | 32 |
| Example 7 | 45 |
| Example 8 | 42 |
| Example 9 | 9 |
| Example 10 | 24 |
| Example 11 | 1.5 |
| Example 12 | 11 |
| Example 13 | 18 |
| Comparative Example 1 | 5.2 |
| Comparative Example 2 | 0.8 |

Referring to Table 4, tensile strengths of the polymer electrolytes prepared in Examples 1 to 13 of the present invention were mostly 9 MPa or more, such that it may be understood that the tensile strengths were better than those of the polymer electrolytes prepared in Comparative Examples 1 and 2.

The above descriptions are merely exemplary embodiments for implementing the composition for a polymer electrolyte according to the present invention, the method of preparing a polymer electrolyte using the same, and the secondary battery including the polymer electrolyte prepared from the composition, so that the present invention is not limited thereto.

The true scope of the present invention should be defined to the extent that those skilled in the art can make various modifications and changes thereto without departing from the scope of the invention, as defined by the appended claims.

The invention claimed is:

1. A polymer electrolyte for a secondary battery, the polymer electrolyte comprising:

a lithium salt; and unit A derived from polymer (a) represented by Formula 1:

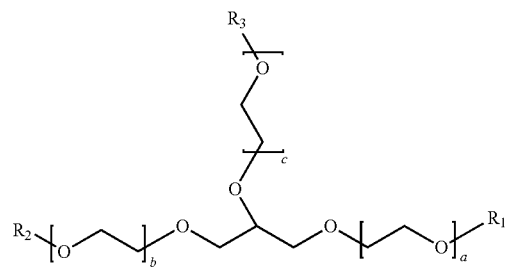

[Formula 1]

wherein, in Formula 1, $R_1$, $R_2$, and $R_3$ are each independently hydrogen or $-CH_2-CH=CH_2$, at least one of $R_1$, $R_2$, and $R_3$ is $-CH_2-CH=CH_2$, each of a, b, and c is the number of repeating units, and a, b, and c are each independently an integer of any one of 1 to 10,000, and wherein a weight ratio of the lithium salt to the unit A derived from the polymer (a) represented by Formula 1 is in a range of 1:1 to 1:9.

2. The polymer electrolyte of claim 1, wherein the polymer (a) represented by Formula 1 comprises at least one selected from the group consisting of polymers represented by Formulae 1a to 1c:

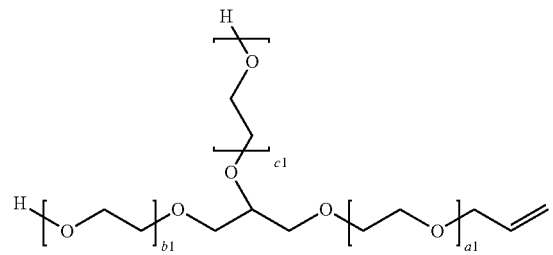

[Formula 1a]

wherein, in Formula 1a, each of a1, b1, and c1 is the number of repeating units, and a1, b1, and c1 are each independently an integer of any one of 1 to 10,000,

[Formula 1b]

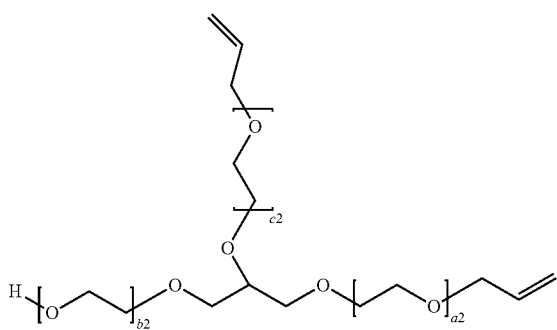

wherein, in Formula 1b,
each of a2, b2, and c2 is the number of repeating units, and
a2, b2, and c2 are each independently an integer of any one of 1 to 10,000, and

[Formula 1c]

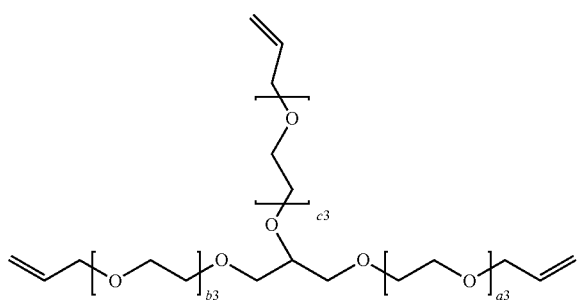

wherein, in Formula 1c,
each of a3, b3, and c3 is the number of repeating units, and
a3, b3, and c3 are each independently an integer of any one of 1 to 10,000.

3. The polymer electrolyte of claim 1, wherein a weight ratio of the lithium salt to the unit A derived from the polymer (a) represented by Formula 1 is in a range of 1:1 to 1:6.

4. The polymer electrolyte of claim 1, further comprising an oxygen ($O_2$) inhibitor.

5. A composition comprising
a lithium salt;
an organic solvent; and
a polymer (a) represented by Formula 1:

[Formula 1]

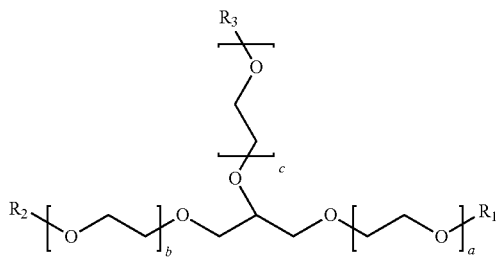

wherein, in Formula 1,
$R_1$, $R_2$, and $R_3$ are each independently hydrogen or —$CH_2$—CH=$CH_2$,
at least one of $R_1$, $R_2$, and $R_3$ is —$CH_2$—CH=$CH_2$,
each of a, b, and c is the number of repeating units, and
a, b, and c are each independently an integer of any one of 1 to 10,000, and
wherein a weight ratio of the lithium salt to the polymer (a) represented by Formula 1 is in a range of 1:1 to 1:9.

6. The composition of claim 5, wherein a weight ratio of the lithium salt to the polymer (a) represented by Formula 1 is in a range of 1:1 to 1:6.

7. The composition of claim 5, further comprising a polymerization initiator.

8. The composition of claim 5, further comprising an oxygen ($O_2$) inhibitor.

9. A method of preparing a secondary battery, the method comprising:
coating the composition of claim 5 on at least one surface of a positive electrode, a negative electrode, and a separator; and
forming a polymer electrolyte for a secondary battery by thermal curing the composition.

10. A method of preparing a secondary battery, the method comprising:
coating the composition of claim 5 on a base;
forming a polymer electrolyte for a secondary battery by thermally curing the composition;
separating the polymer electrolyte from the base; and
disposing the separated polymer electrolyte on at least one surface of a negative electrode, a positive electrode, and a separator.

11. A lithium secondary battery comprising the polymer electrolyte of claim 1.

12. The polymer electrolyte of claim 1, wherein the oxygen inhibitor includes tris(2,2,2-trifluoroethyl)phosphite.

13. The polymer electrolyte of claim 1, wherein an amount the oxygen inhibitor is 0.1 wt % to 10 wt % based on a total weight of solid content in the polymer electrolyte.

14. The composition of claim 5, wherein the oxygen inhibitor includes tris(2,2,2-trifluoroethyl)phosphite.

15. The composition of claim 5, wherein an amount the oxygen inhibitor is 0.1 wt % to 10 wt % based on a total weight of solid content in the composition.

16. The polymer electrolyte of claim 1, wherein a weight ratio of the lithium salt to the unit A derived from the polymer (a) represented by Formula 1 is in a range of 1:2 to 1:4.

* * * * *